ized Sept. 20, 1960

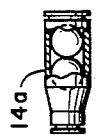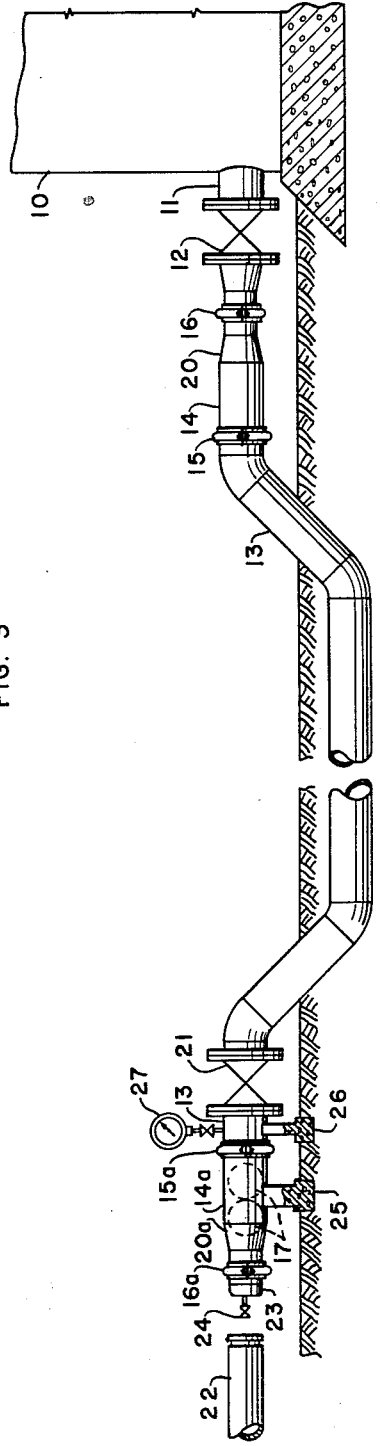

United States Patent Office 2,953,158
Patented Sept. 20, 1960

2,953,158
APPARATUS FOR EVACUATING PIPELINES

Carter Laurence Shea, Indianapolis, Gail D. Harden, Mooresville, and Maurice L. Barrett, Jr., Zionsville, Ind., assignors to Shell Oil Company, New York, N.Y., a corporation of Delaware Filed Mar. 31, 1958, Ser. No. 725,044

2 Claims. (Cl. 137—268)

This invention relates to pipeline installations and pertains more particularly to apparatus for evacuating long sections of a liquid filled pipeline having a changing gradient so that it cannot be drained.

Due to the physical characteristics or cost of certain liquids handled by a pipeline system, it is frequently desirable that the pipeline be emptied after a delivery of liquid has been made through it. Thus, most pipeline systems handling fluids of this type are arranged so that they may be readily drained by gravity. However, in certain locations where a long run of a pipeline extends through an area which is uneven in contour, a pipeline system handling a liquid which tends to solidify or which readily freezes is subject to operation hold-ups due to the fluid becoming semisolid or freezing in the line.

Thus, for example, in a pipeline installation where a material such as glycerine is delivered by barge to an unloading dock and then pumped through 2,000 feet of pipeline over uneven ground to a storage tank, it is presently necessary to trace the pipeline with either steam or hot water coils, or to otherwise heat the liquid and to insulate the line in order to maintain any residual glycerine in the line in fluid condition during the cold months of the year so that the line may be kept operable.

It is, therefore, a primary object of the present invention to provide apparatus for evacuating a fluid from a pipeline passing through an area which is uneven in contour and replacing the fluid with another of dissimilar nature.

A further object of this invention is to provide apparatus which may be readily inserted in and removed from a pipeline to evacuate the pipeline as it passes therethrough.

These and other objects of this invention will be understood from the following description taken with reference to the drawing wherein:

Figures 1 and 2 are schematic and plan views, respectively, of pipeline systems and related equipment according to the present invention.

Figure 3 is a plan view of a ball-holding cartridge or spool piece employed in the present system.

Referring to Figure 1, a storage tank 10 is shown as having fluid port means 11 which is normally closed by a valve of any desired type 12. Extending from the valve 12 is a delivery pipeline 13 of any suitable material and desired size. Positioned in the pipeline adjacent the valve 12 is a spool piece 14 which is connected in a fluid-tight manner in said pipeline 13, preferably by means of a pair of quick-acting couplings 15 and 16, although any other type of coupling or flange may be employed.

The interior of the spool piece is provided with means for catching or stopping therein a plug or other object such as a sphere or spheroid 17 having a diameter at least equal to the inside diameter of the pipeline 13.

In the embodiment illustrated, the spool piece 14 is provided with plug-catching or stopping means which takes the form of a constriction or reduced cross-sectional area portion 20. However, instead of employing a spool piece 14 having a portion with reduced diameter any other suitable stop means such as a transversely-positioned bar, grid or spider may be permanently mounted transversely within the spool piece which would stop a plug having a diameter equal to the pipeline from passing therethrough while permitting the passage of fluid thereby. Since stop means for propelled objects within pipelines are well known to the art, they will not be further illustrated and described here.

A valve 21 having a round opening equal to the diameter of the pipeline 13 and in axial alignment therewith is positioned at the other end of the pipeline.

The pipeline 13 on the opposite side of the valve 21 may be connected to a cargo unloading hose 22, for example, at a dock, although the source of fluid transported through pipeline 13 need not necessarily be restricted to marine cargos. When the cargo hose 22 is uncoupled from the pipe 13 or valve 21, a spool piece 14a, identical in shape and dimensions with spool piece 14 at the other end of the pipeline 13 and provided with quick connect and disconnect couplings 15a and 16a, may be connected to the pipeline 13 adjacent to the valve 21. The open end of the spool piece 14a may be closed by a blank flange or preferably by a cap 23 provided with valve means 24 whereby a gas under pressure may be introduced into the pipeline 13. Preferably, a suitable support in the form of posts 25 and 26 is provided to position the spool piece 14a at the level of the valve 21.

The present method comprises inserting movable partition means in one end of a fluid filled pipeline and propelling the movable partition means to the other end of the pipeline by means of pressurized gas to evacuate the pipeline. The movable partition means employed in practicing the present invention may be solid bodies in the form of plugs or short dumbbell-type scrapers but, for ease in handling, preferably in the form of spheres or spheroid 17, of the type described and illustrated in copending applications Serial No. 689,804, filed October 14, 1957 to Harden, and Serial No. 690,012, filed October 14, 1957 to Osborne et al. The movable partition means 17 are preferably made of rubber, either synthetic or natural, or a combination thereof, or a plastic material, either material being of a suitable hardness and elasticity and the walls of sufficient thickness to give sufficient structural strength to the spheres, plug or other movable partition means so as to maintain a tight fit and hence a good seal against the pipe wall while passing through the pipeline 13. Spheres 17 are preferred rather than plugs as they pass through valves and around elbows much more readily. It is preferred that the spheres be made of a material that is at least slightly resilient so that if hollow spheres are employed they can be inflated and expanded slightly to the desired diameter. These spheres are preferably inflated through suitable valve means with a noncompressible liquid which is preferably one that will not freeze under conditions of use. The diameter of this sphere should be slightly greater than the inside diameter of the pipeline through which it is to travel.

Spool pieces 14 and 14a may be described as cartridges for holding the spheres 17 at either end of the pipeline. In operation, after a delivery, of say glycerine, has been made by pumping the glycerine from a barge (not shown), through the unloading hoses 22 and pipeline 13 into storage tank 10, the pipeline 13 (which is not able to be drained) is still full of glycerine. Valve 21 is closed and then the unloading hose 22 is drained and disconnected from the pipeline 13. The spool piece or cartridge 14a, equipped with cap 23 and one or more spheres 17, is secured by coupling 15a to pipeline 13 and valve 21 is opened.

Compressed air, from a suitable source, is introduced through valve connection 24 into the spool piece or cartridge 14a in the back of the sphere(s) 17 therein. The sphere(s) is driven by the compressed air through the pipeline 13, driving the glycerine ahead of it and through open valve 12 into storage tank 10. When it is known that the sphere(s) 17 has traversed the pipeline 13 and has been stopped by the restricted area in the spool piece or cartridge 14 positioned adjacent to the tank 10, valve 12 is closed. If desired, a pressure gauge 27 may be positioned in the pipeline which will indicate a build-up in pressure when the sphere(s) 17 is caught in the cartridge 14 near the tank 10. Alternately, a mechanical type scraper indicator common to the trade may be positioned on or close to cartridge 14 and 14a to indicate visually or electrically the actual departure of the sphere from 14a and its arrival in 14. If desired, arrival of the sphere in the cartridge may be determined by timing its passage through the pipeline.

With pipeline 13 empty of liquid and vented to atmosphere through air valve 24 and with valve 12 closed, the spool pieces or cartridges 14 and 14a are uncoupled from the pipeline and the cartridge 14 which now contains the movable partition means or sphere(s) 17 is moved to the other end of the pipeline 13 where it is held in readiness for coupling to pipeline 13 in a reversed position when it is subsequently desired to evacuate the liquid of a subsequent delivery of liquid from the pipeline. In a like manner the cartridge 14a, which is empty and which was removed from the pipeline 13, is moved down to the other end of the pipeline after cap 23 has been disconnected from it. The cartridge 14a is then inserted in pipeline 13 adjacent to valve 12 in a reversed position so as to enable a subsequent delivery of liquid through the pipeline and the stopping of a subsequent movable partition or sphere used to displace such liquid.

At the time the spool piece 14 is moved down to the source end of the pipeline, the sphere(s) 17 is permitted to remain in it and the cap 23 is installed on it. It is held in readiness for installation on pipeline 13 by means of coupling 15a when the unloading hose 22 has been disconnected therefrom subsequent to the next delivery of liquid. When it has been reinstalled on the pipeline and the air pressure again applied behind the sphere(s), it will be propelled out of the cartridge 14 and into and through the pipeline again. The cartridge 14a, now in the pipeline at the tank end, will stop the sphere. In this manner the cartridges 14 and 14a are alternated and reversed in position for each individual delivery of liquid through the pipeline.

The present apparatus may be varied as to piping arrangement to satisfy existing localized requirements. It is not restricted to the displacement of a liquid from a pipeline by air, but may be employed to evacuate a liquid from a pipeline while at the same time replacing that liquid with another and dissimilar liquid, at the same time effecting essentially total and complete separation of two such liquids through the elimination of intermixing between them.

The practice of this modification of the present invention will be more clearly understood by reference to Figure 2, a drawing comprising the essential elements of Figure 1 but intended for the transportation and delivery of a multiplicity of liquids ($A_1$, $B_1$, $C_1$ and $D_1$) alternately through a common delivery pipeline 13 to their respective destinations ($A_2$, $B_2$, $C_2$ and $D_2$) and finally, the evacuation of all liquid from the carrier pipeline 13 and its replacement with air.

This modification of the invention is practiced by employing three cartridges as described for Figure 1, these now being 14, 14a and 14b, each identical in nature, construction and dimensions. Commencing with a new pipeline 13 or one completely free of liquid, and with cartridges 14 and 14b in place as illustrated in Figure 2, valves 28, 21, 38 and 12a may be opened, for instance, and a delivery of liquid $A_1$ made through pipeline 13 to its designated destination $A_2$. Upon completion of the delivery of the desired quantity of liquid $A_1$, valves 28 and 21 are closed. A drain valve 35 on header 32 is opened until the entire header and cartridge are drained dry. Drain valve 35 is closed and cartridge 14b removed by means of quick couplings 15a and 16a from its position adjacent to valve 21. Cartridge 14a, containing an elastic sphere is installed adjacent to valve 21, in the place vacated by the previous cartridge 14b. Vent valve 34 on the top of header 32 is then opened. Valve 29 is partially opened until the liquid $B_1$ has completely filled header 32, whereupon valve 34 is closed. Valve 29 may be completely opened along with or before valve 21. This causes the liquid $B_1$ to propel the sphere through the pipeline 13 where it will be stopped and caught in cartridge 14. Liquid flow will be stopped by the sphere stoppage at this time. Valves 38 and 12a are then closed and drain valves 37 and 39 are opened to drain the liquid $A_1$ from the header downstream from the sphere and the liquid $B_1$ from the cartridge respectively. When the draining is complete cartridge 14 is removed by means of its quick couplings 15 and 16 and returned to the source end of the pipeline. The empty cartridge 14b is installed in its stead in a reversed position, valves 37 and 39 are closed and valves 38 and 12b are opened. Liquid $B_1$ is thus permitted to flow to its destination $B_2$.

A third and a fourth (or even more) liquids such as $C_1$ and $D_1$ may be transported and delivered through the pipeline 13 to their respective destinations by simple repetition of the method previously described using a sphere to separate each dissimilar quantity of liquid.

When the desired quantity of the final liquid to be transported has been delivered into the pipeline at its source, as for instance the fourth liquid $D_1$, the line is shut down by closing valves 31 and 21. Drain valves 35 and 40 and vent valve 34 are opened and the liquid $D_1$ remaining between the header valves (28, 29, 30 and 31) and valve 21 is drained out. When draining is complete, the empty cartridge in the line 13 near valve 21 at that time is removed and replaced with a cartridge containing a sphere, such cartridge having been returned from the receiving end of the pipeline. Valves 35 and 40 are now closed, valve 21 opened and a suitable source of air under pressure is connected to air line valve 34. Air under pressure is then forced into the header 32 causing the sphere to be propelled through the pipeline 13 where it is stopped and caught in the empty cartridge at the downstream end of the pipeline. At this time, as previously described with regard to Figure 1, valves 12d and 38 are closed and the air pressure released from the carrier pipeline through air vent 34 on header 32. Valves 39 and 37 are opened, venting air from 39 and draining liquid $D_1$ from 37. When this draining and venting are complete, the cartridge adjacent valve 38 containing the sphere is removed from the pipeline and replaced with an empty one from the source end of the pipeline. Valves 37 and 39 are closed and valve 38 is opened. Valve 34 is closed, whereupon the pipeline will be free of liquid and in condition to commence the delivery of additional liquid(s) at a desired future time.

We claim as our invention:

1. Apparatus for evacuating or displacing the contained liquid from a length of fluid-filled pipeline which is in communication with a storage tank, or other receiving facilities, said apparatus comprising a storage tank, fluid port means in the wall of said tank, conduit means connected to said fluid port means, first closure means in said conduit means adjacent the tank, second closure means adjacent the other end of the said conduit means, movable partition means of a diameter at least equal to the inside diameter of said conduit means, a first spool piece selectively closed at one end and removably-connected to said conduit means adjacent said second closure means, said first spool piece containing said movable partition means, means for injecting a fluid under pressure into said first spool piece in back of said partition means, whereby said partition means may be propelled through said conduit means to drive the liquid therefrom into said tank, and a second spool piece removably connected into said conduit means adjacent said first closure means away from the tank, said first and second spool pieces being interchangeable and having means for catching and removing said partition means from said conduit means near the discharge end thereof.

2. Apparatus for evacuating or displacing the contained fluid from a length of liquid-filled pipeline which is in communication between fluid intake and discharge locations, said apparatus comprising first and second valve manifolds, conduit means connected between said manifolds, first closure means in said conduit means adjacent said first manifold, second closure means adjacent the second manifold of said conduit means, selectively operable draining and venting means between the first manifold and the first closure means and between the second manifold and the second closure means, movable partition means of a diameter at least equal to the inside diameter of said conduit means, a first spool piece removably connected into said conduit means between the first manifold and the first closure means, a second spool piece removably connected into said conduit means between the second manifold and the second closure means, said first and second spool pieces being interchangeable and having means for catching and removing said partition means, said first spool piece being upstream of second spool piece in said conduit means and adapted to be disconnected for insertion of said partition means after a fluid delivery between the manifolds, means for injecting a dissimilar fluid under pressure on the upstream end of said first spool piece and in back of said partition means whereby said partition means is propelled through said conduit to drive original fluid therefrom, said partition means being stopped and retained in the second spool piece for removal and reuse at the source end of the conduit means.

References Cited in the file of this patent
UNITED STATES PATENTS

| | | |
|---|---|---|
| 2,623,226 | Jones | Dec. 30, 1952 |
| 2,669,936 | Elkins | Feb. 23, 1954 |
| 2,705,419 | Chawner | Apr. 5, 1955 |
| 2,796,878 | Atkinson | June 25, 1957 |